US012754436B2

(12) United States Patent
Lin

(10) Patent No.: US 12,754,436 B2
(45) Date of Patent: Oct. 6, 2026

(54) HEAD-MOUNTED DISPLAY DEVICE AND WEARABLE PART THEREOF

(71) Applicant: CHENG UEI PRECISION INDUSTRY CO., LTD., New Taipei City (TW)

(72) Inventor: Chin-Chung Lin, New Taipei City (TW)

(73) Assignee: CHENG UEI PRECISION INDUSTRY CO., LTD., New Taipei City (TW)

( * ) Notice: Subject to any disclaimer, the term of this patent is extended or adjusted under 35 U.S.C. 154(b) by 191 days.

(21) Appl. No.: 18/827,824

(22) Filed: Sep. 8, 2024

(65) Prior Publication Data

US 2025/0199322 A1 Jun. 19, 2025

(30) Foreign Application Priority Data

Dec. 14, 2023 (CN) ........................ 202323423260.3

(51) Int. Cl.
*G02B 27/01* (2006.01)

(52) U.S. Cl.
CPC .. *G02B 27/0176* (2013.01); *G02B 2027/0154* (2013.01); *G02B 2027/0161* (2013.01)

(58) Field of Classification Search
CPC .... G02B 2027/0161; G02B 2027/0154; G02B 27/0176
USPC .......................................................... 359/630
See application file for complete search history.

(56) References Cited

U.S. PATENT DOCUMENTS 5,746,693 A * 5/1998 Spitz .................. A61B 1/00147 600/162
5,954,642 A * 9/1999 Johnson ............. G02B 27/0176 600/300
D427,982 S * 7/2000 Ishii ............................. D14/372
6,388,640 B1 * 5/2002 Chigira .............. G02B 27/0176 359/13
2018/0095498 A1 * 4/2018 Raffle ................ G06K 7/10297
2018/0314323 A1 * 11/2018 Mikhailov ............ G06T 19/006

* cited by examiner

*Primary Examiner* — Lin Ye
(74) *Attorney, Agent, or Firm* — Cheng-Ju Chiang

(57) ABSTRACT

A head-mounted display device includes a wearable part and a display part. The wearable part includes a main body, an upper head band, two side head bands, and a flexible adjusting clip mounted on the main body. One end of the upper head band has a beginning end fastened with a top of the display part, and the other end of the upper head band has a terminal end fastened with a top of the main body. Two ends of the two side head bands are connected with two sides of the main body. The flexible adjusting clip includes an extension housing, a penetrating groove, an adjusting button having two guiding rods, and two elastic elements. The two elastic elements are worn around the two guiding rods. The other two ends of the two side head bands are connected with two sides of the display part.

18 Claims, 10 Drawing Sheets

HEAD-MOUNTED DISPLAY DEVICE AND WEARABLE PART THEREOF

CROSS REFERENCE TO RELATED APPLICATIONS

The present application is based on, and claims priority from, China Patent Application No. 202323423260.3, filed Dec. 14, 2023, the disclosure of which is hereby incorporated by reference herein in its entirety.

BACKGROUND OF THE INVENTION

Field of the Invention

The present invention generally relates to a head-mounted display device, and more particularly to a head-mounted display device which prevents an upper head band from getting loose, and a wearable part of the head-mounted display device which is able to adjust a length of the upper head band conveniently and is worn more stably.

Description of Related Art

In order to ensure that users with different body forms are able to wear head-mounted display devices comfortably, the head-mounted display devices are often equipped with an upper strap and two side straps, and lengths of the upper strap and the two side straps are adjustable. A conventional head-mounted display device includes an augmented reality displayer, a metencephalic pad, and the upper strap and the two side straps connected between the augmented reality displayer and the metencephalic pad.

In order to make the lengths of the two side straps adjustable, the two side straps are connected to an adjusting mechanism which is mounted to the metencephalic pad so as to make the user adjust the lengths of the upper strap and the two side straps by rotating the adjusting mechanism. In order to make the length of the upper strap adjustable, a front end and a rear end of the upper strap are respectively connected with a hook structure and a loop structure of a hook and loop fastener to make the front end of the upper strap and the rear end of the upper strap fastened by adhering the hook structure of the hook and loop fastener with the loop structure of the hook and loop fastener, and the length of the upper strap is adjusted by separating the hook structure of the hook and loop fastener from the loop structure of the hook and loop fastener repeatedly, and adhering the hook structure of the hook and loop fastener with the loop structure of the hook and loop fastener, so different lengths of the upper strap are appropriate for different head sizes of the users.

However, when the upper strap is pulled, the hook and loop fastener is easily torn off on account of an insufficient binding force, so the upper strap is loosened from the augmented reality displayer and the metencephalic pad, and the user uses the conventional head-mounted display device inconveniently. Furthermore, a design of the hook and loop fastener makes the length of the upper strap adjusted difficultly under a status of wearing the conventional head-mounted display device, so if the user wears conventional head-mounted display device, and the user finds that the length of the upper strap needs adjusting slightly, the conventional head-mounted display device is removed to be adjusted.

Therefore, it is necessary to provide a head-mounted display device which prevents an upper head band from getting loose, and a wearable part of the head-mounted display device which is able to adjust a length of the upper head band conveniently and is worn more stably.

BRIEF SUMMARY OF THE INVENTION

An object of the present invention is to provide a wearable part, comprising: a main body; an upper head band having a terminal end, the terminal end connected to a top of the main body; a flexible adjusting clip mounted on the top of the main body, the flexible adjusting clip having an extension housing having a base portion extended upward from an upper surface of the main body, an operating part extended upward from a middle of a top of the base portion, and two abreast guiding units protruded outward from an outer portion of the operating part, an adjusting space being formed between the base portion and the main body, each guiding unit having a first guiding ring and a second guiding ring which are in alignment with each other, the two first guiding rings of the two guiding units being aligned, the two second guiding rings of the two guiding units being aligned, the two first guiding rings and the two second guiding rings being arranged in two rows, a penetrating groove longitudinally penetrating through the extension housing, the terminal end of the upper head band passing through the penetrating groove, an adjusting button movably received in the extension housing, the adjusting button having two guiding rods and a fastening portion, the upper head band being movably disposed between the fastening portion and a wall of the penetrating groove, a portion of an outer peripheral surface of each guiding rod extending radially to form a limiting ring, the fastening portion being connected between two inner portions of the two limiting rings of the two guiding rods, a middle of an outer surface of the fastening portion protruding outward and perpendicular to the two guiding rods to form a pushing portion, the pushing portion being located between the two limiting rings of the two guiding rods, the pushing portion being movably exposed out of the penetrating groove, and two elastic elements worn around the two guiding rods, one end of each guiding rod passing through the first guiding ring of one guiding unit, and the other end of each guiding rod passing through the second guiding ring of the one guiding unit, the two elastic elements being elastically located between the two first guiding rings and the two limiting rings, the two limiting rings and the two elastic elements being positioned between the two first guiding rings and the two second guiding rings, the two guiding rods moving along the two guiding units to compress the two elastic elements to make the fastening portion of the adjusting button move away from the wall of the penetrating groove or release the two elastic elements to make the fastening portion of the adjusting button approach the wall of the penetrating groove, so the upper head band being pulled through the adjusting space to adjust a length of the upper head band, or the upper head band being clamped between the fastening portion and the wall of the penetrating groove to make the upper head band fastened by the flexible adjusting clip.

Another object of the present invention is to provide a head-mounted display device, comprising: a wearable part having a main body, an upper head band, one end of the upper head band having a beginning end, and the other end of the upper head band having a terminal end, the terminal end being fastened with a top of the main body of the wearable part, any position of the upper head band between the beginning end and the terminal end being selectable to be defined as a clamping portion, two side head bands, two ends of the two side head bands being connected with two sides of the main body, and a flexible adjusting clip mounted on the main body, the flexible adjusting clip having an extension housing having a base portion extended upward from an upper surface of the main body, an operating part extended upward from a middle of a top of the base portion, and two abreast guiding units protruded outward from an outer portion of the operating part, an adjusting space being formed between the base portion and the main body, each guiding unit having a first guiding ring and a second guiding ring which are in alignment with each other, the two first guiding rings of the two guiding units being aligned, the two second guiding rings of the two guiding units being aligned, the two first guiding rings and the two second guiding rings being arranged in two rows, a penetrating groove longitudinally penetrating through the extension housing, the upper head band passing through the penetrating groove, an adjusting button movably received in the extension housing, the adjusting button having two guiding rods and a fastening portion, the upper head band being movably disposed between the fastening portion and a wall of the penetrating groove, a portion of an outer peripheral surface of each guiding rod extending radially to form a limiting ring, the fastening portion being connected between two inner portions of the two limiting rings of the two guiding rods, a middle of an outer surface of the fastening portion protruding outward and perpendicular to the two guiding rods to form a pushing portion, the pushing portion being located between the two limiting rings of the two guiding rods, the pushing portion being movably exposed out of the penetrating groove, and two elastic elements worn around the two guiding rods, one end of each guiding rod passing through the first guiding ring of one guiding unit, and the other end of each guiding rod passing through the second guiding ring of the one guiding unit, the two elastic elements being elastically located between the two first guiding rings and the two limiting rings, the two limiting rings and the two elastic elements being positioned between the two first guiding rings and the two second guiding rings, the two guiding rods moving along the two guiding units to compress the two elastic elements to make the fastening portion of the adjusting button move away from the wall of the penetrating groove or release the two elastic elements to make the fastening portion of the adjusting button approach the wall of the penetrating groove, so the upper head band being pulled through the adjusting space to adjust a length of the upper head band, or the clamping portion of the upper head band being clamped between the fastening portion and the wall of the penetrating groove to make the upper head band fastened by the flexible adjusting clip; and a display part, the beginning end of the upper head band being fastened with a top of the display part, the other two ends of the two side head bands being connected with two sides of the display part.

Another object of the present invention is to provide a wearable part, comprising: a main body, an upper head band, the upper head band having a terminal end, the terminal end being fastened with the main body, an adjusting clip mounted on the main body, the adjusting clip having an extension housing having a base portion extended from the main body, an operating part extended from the base portion, and an adjusting space being formed between the base portion, the main body and the terminal end, a penetrating groove longitudinally penetrating through the extension housing, the terminal end of the upper head band passing through the penetrating groove, a protective cover covered to the operating part of the extension housing, a receiving space formed between the protective cover and the operating part of the extension housing, the receiving space being communicated with the penetrating groove, an adjusting button received in the receiving space, the adjusting button movably blocking the upper head band, the adjusting button having a fastening portion and a pushing portion, the upper head band being movably disposed between the fastening portion and a wall of the penetrating groove, the pushing portion projecting out of the receiving space, the pushing portion being movably exposed out of the penetrating groove, and at least one elastic element received in the receiving space to press the fastening portion to abut against the upper head band, the upper head band being clamped between the fastening portion and the wall of the penetrating groove.

As described above, the head-mounted display device includes the wearable part surrounding a head of a user to provide a support for the display part, and the display part worn in front of two eyes of the user to display an image to the user, the wearable part includes the main body, the upper head band of which two ends are connected between the top of the main body and the top of the display part, the extension housing extended upward from an upper surface of a main housing of the main body, and the flexible adjusting clip mounted on the main body, so that the user selects any position between the beginning end and the terminal end of the upper head band as the clamping portion of the upper head band according to a need of the user, and then the flexible adjusting clip is fixed to the clamping portion of the upper head band to adjust the length of the upper head band between the wearable part and the display part. Furthermore, in order to facilitate pulling the upper head band by the user, a longitudinal distance is formed between the base portion of the extension housing and the terminal end of the upper head band, so the adjusting space is formed among the clamping portion, the base portion of the extension housing, and the terminal end of the upper head band, the adjusting space brings a convenience for the user to pull the upper head band, and the adjusting button is pushed to pull the upper head band from the adjusting space to effectively adjust an overall length of the upper head band between the main body and the display part for changing a size of a wearing space. In addition, the adjusting button is fastened to clamping portion of the upper head band, so that the upper head band which has the adjusted length keeps being fastened to a position of the head-mounted display device, the head-mounted display device prevents the upper head band from getting loose, and the wearable part of the head-mounted display device is able to adjust the length of the upper head band conveniently and is worn more stably. As a result, a wearing stability of the head-mounted display device is improved.

BRIEF DESCRIPTION OF THE DRAWINGS

The present invention will be apparent to those skilled in the art by reading the following description, with reference to the attached drawings, in which.

DETAILED DESCRIPTION OF THE INVENTION

Figure 1:
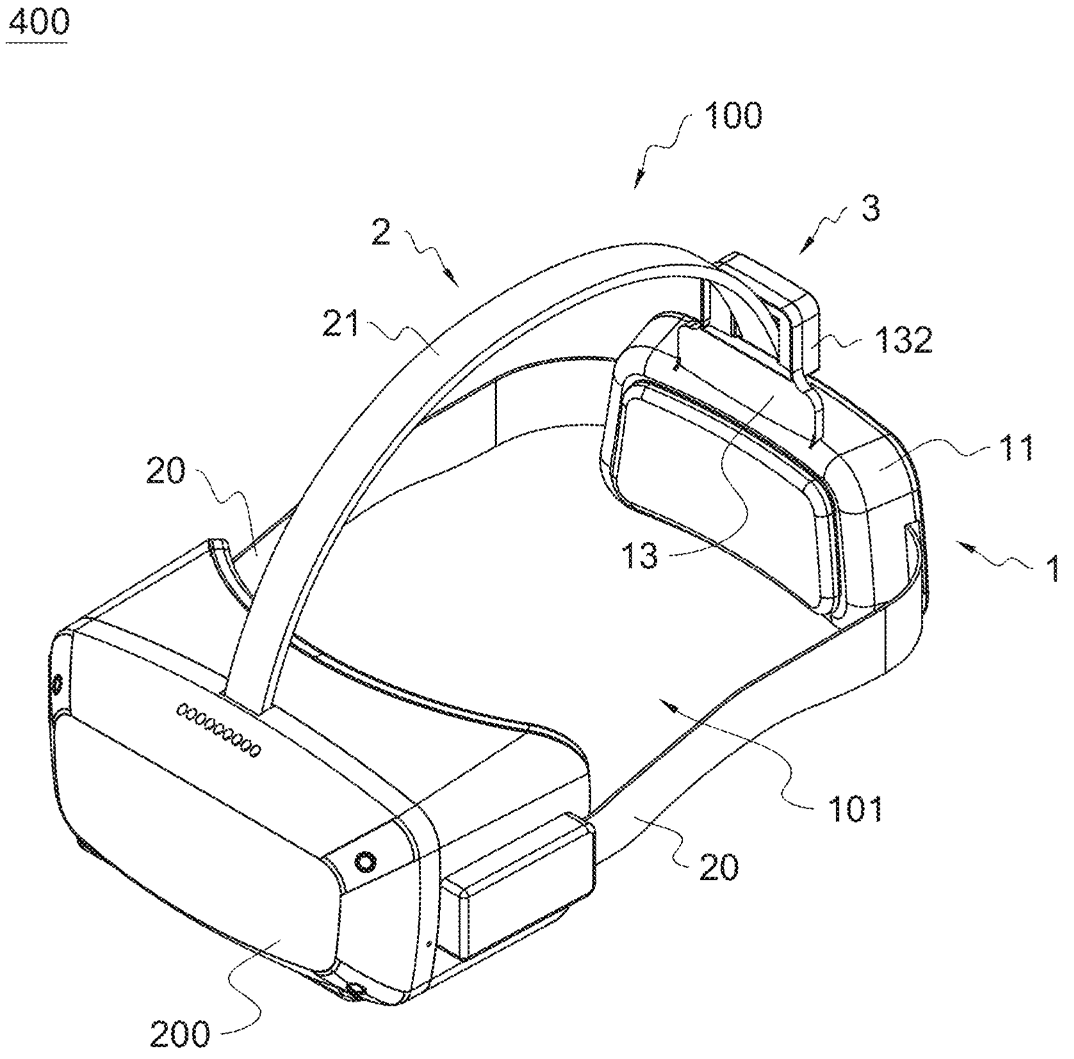
FIG. 1 is a perspective view of a head-mounted display device in accordance with the present invention.
Figure 2:
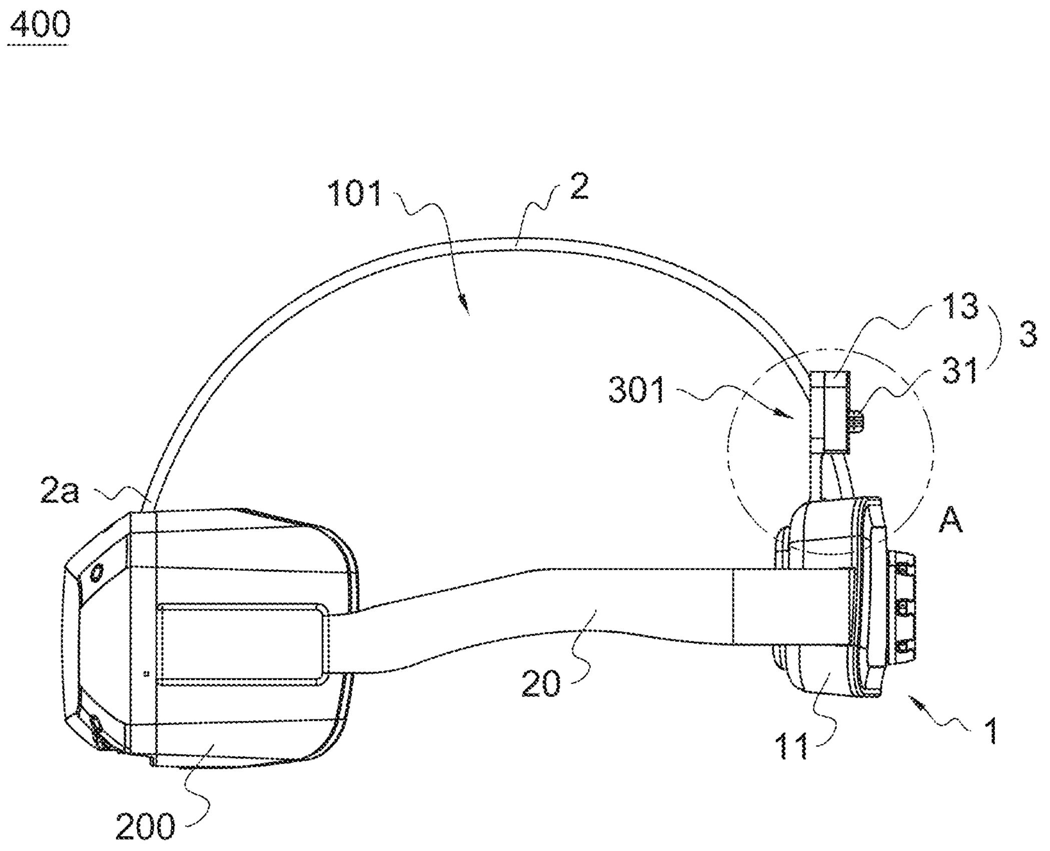
FIG. 2 is a side view of the head-mounted display device in accordance with the present invention.
Figure 3:
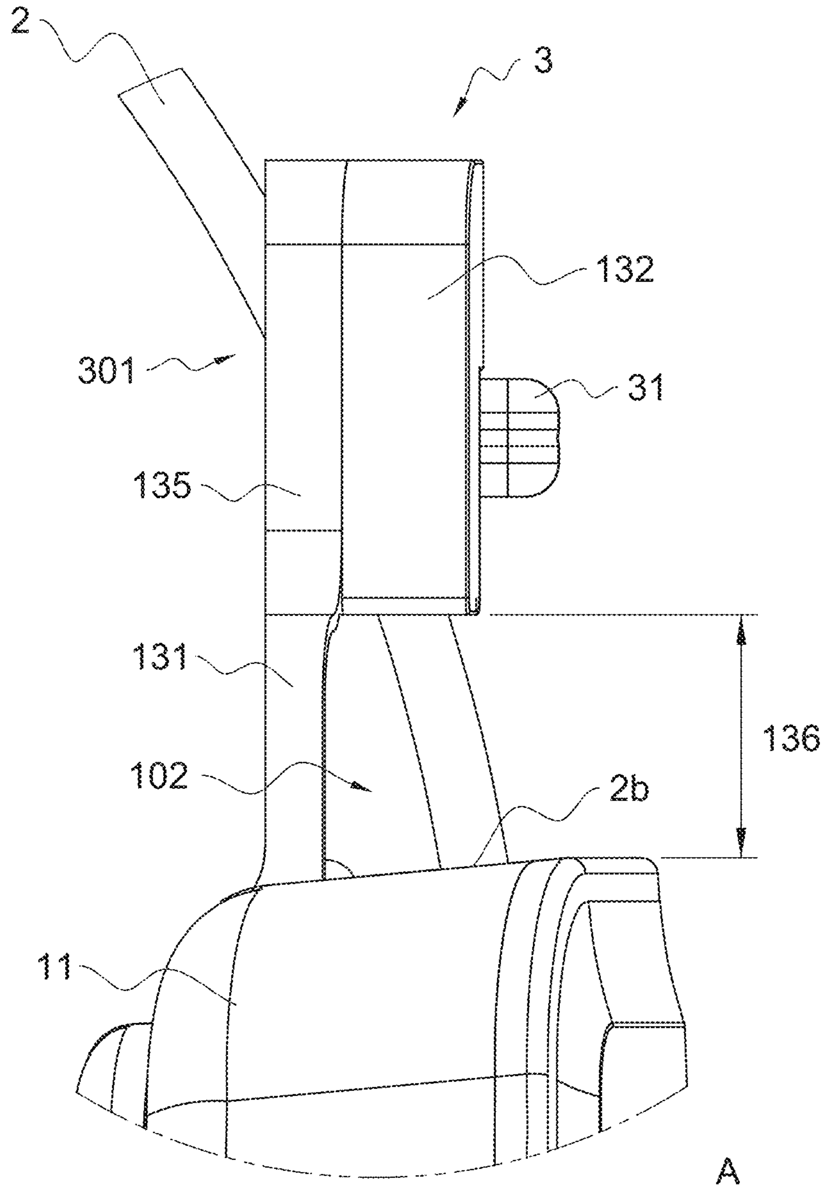
FIG. 3 is an enlarged view of an encircled portion A of the head-mounted display device of FIG. 2.

Referring to FIG. 1 and FIG. 2, a head-mounted display device 400 and a wearable part 100 of the head-mounted display device 400 according to the present invention are shown. The head-mounted display device 400 includes the wearable part 100 and a display part 200. The head-mounted display device 400 is worn to a head of a user. The display part 200 is configured to be worn in front of two eyes of the user to display an image to the user. The wearable part 100 is worn on a top of the head of the user to provide a support for the display part 200. The wearable part 100 surrounds the top of the head of the user. The wearable part 100 of the head-mounted display device 400 includes a main body 1, an upper head band 2 connected between a top of the main body 1 and a top of the display part 200, two side head bands 20 connected between two sides of the display part 200 and two sides of the main body 1, and a flexible adjusting clip 3 mounted on the main body 1. Two ends of the two side head bands 20 are connected with the two sides of the main body 1, and the other two ends of the two side head bands 20 are connected with the two sides of the display part 200.

The upper head band 2 is formed in an arch shape. The upper head band 2 is correspondingly attached on the top of the head of the user. The two side head bands 20 are correspondingly attached to two sides of the head of the user. The upper head band 2, the two side head bands 20, the main body 1 and the display part 200 together define a wearing space 101. A shape and a size of the wearing space 101 are further adjusted by adjusting lengths of the upper head band 2 and the two side head bands 20 which are located between the main body 1 of the wearable part 100 and the display part 200.

Referring to FIG. 2 to FIG. 5, the display part 200 includes a display housing 201, and a display module 202 accommodated in the display housing 201. The main body 1 includes a main housing 11, and a power supply module 12 received in the main housing 11. The flexible adjusting clip 3 is disposed at an upper surface of the main housing 11. The flexible adjusting clip 3 is releasably combined with the upper head band 2, and the flexible adjusting clip 3 is releasably fastened with the upper head band 2.

The flexible adjusting clip 3 includes an extension housing 13, and an adjusting button 31 movably received in the extension housing 13. The extension housing 13 is extended upward from an upper surface of the main body 1. The extension housing 13 is extended upward from the upper surface of the main housing 11. The extension housing 13 is formed as an inverted-T shape. The extension housing 13 is integrally molded with the main body 1 by an integral injection molding technology. The extension housing 13 includes a base portion 131 extended upward from the upper surface of the main body 1, an operating part 135 extended upward from a middle of a top of the base portion 131, and two abreast guiding units 134 protruded outward from an outer portion of the operating part 135. The base portion 131 is extended upward from the upper surface of the main housing 11 of the main body 1. A rear end of the extension housing 13 further has a protective cover 132. The protective cover 132 is covered to an outer surface of the operating part 135 of the extension housing 13. A receiving space 137 is formed between the protective cover 132 and the operating part 135 of the extension housing 13. The receiving space 137 is communicated with a penetrating groove 133. The protective cover 132 is covered to a rear surface of the operating part 135. The receiving space 137 is formed between the operating part 135 and the protective cover 132. The adjusting button 31 is received in the receiving space 137. The upper surface of the main housing 11, a rear surface of the base portion 131 and a bottom surface of the protective cover 132 together define a holding space 136.

One end of the upper head band 2 has a beginning end 2*a* connected to the top of the display part 200, and the other end of the upper head band 2 has a terminal end 2*b* connected to the top of the main body 1 of the wearable part 100. The beginning end 2*a* of the upper head band 2 is fastened with the top of the display part 200, and the terminal end 2*b* of the upper head band 2 is fastened with the top of the main body 1 of the wearable part 100, so that according to a need of the user, any position of the upper head band 2 between the beginning end 2*a* and the terminal end 2*b* of the upper head band 2 is selectable to be defined as a clamping portion 301 of the upper head band 2 by the user, and then the flexible adjusting clip 3 is fixed to the clamping portion 301 of the upper head band 2 to adjust the length of the upper head band 2 between the wearable part 100 and the display part 200. In order to facilitate pulling the upper head band 2 by the user, a longitudinal distance is formed between the base portion 131 of the extension housing 13 and the terminal end 2*b* of the upper head band 2, so an adjusting space 102 is formed between the base portion 131 of the extension housing 13 and the upper surface of the main housing 11 of the main body 1. The clamping portion 301 and the terminal end 2*b* of the upper head band 2 are positioned in the adjusting space 102. The adjusting space 102 brings a convenience for a finger of the user to pull the upper head band 2.

Figure 4:
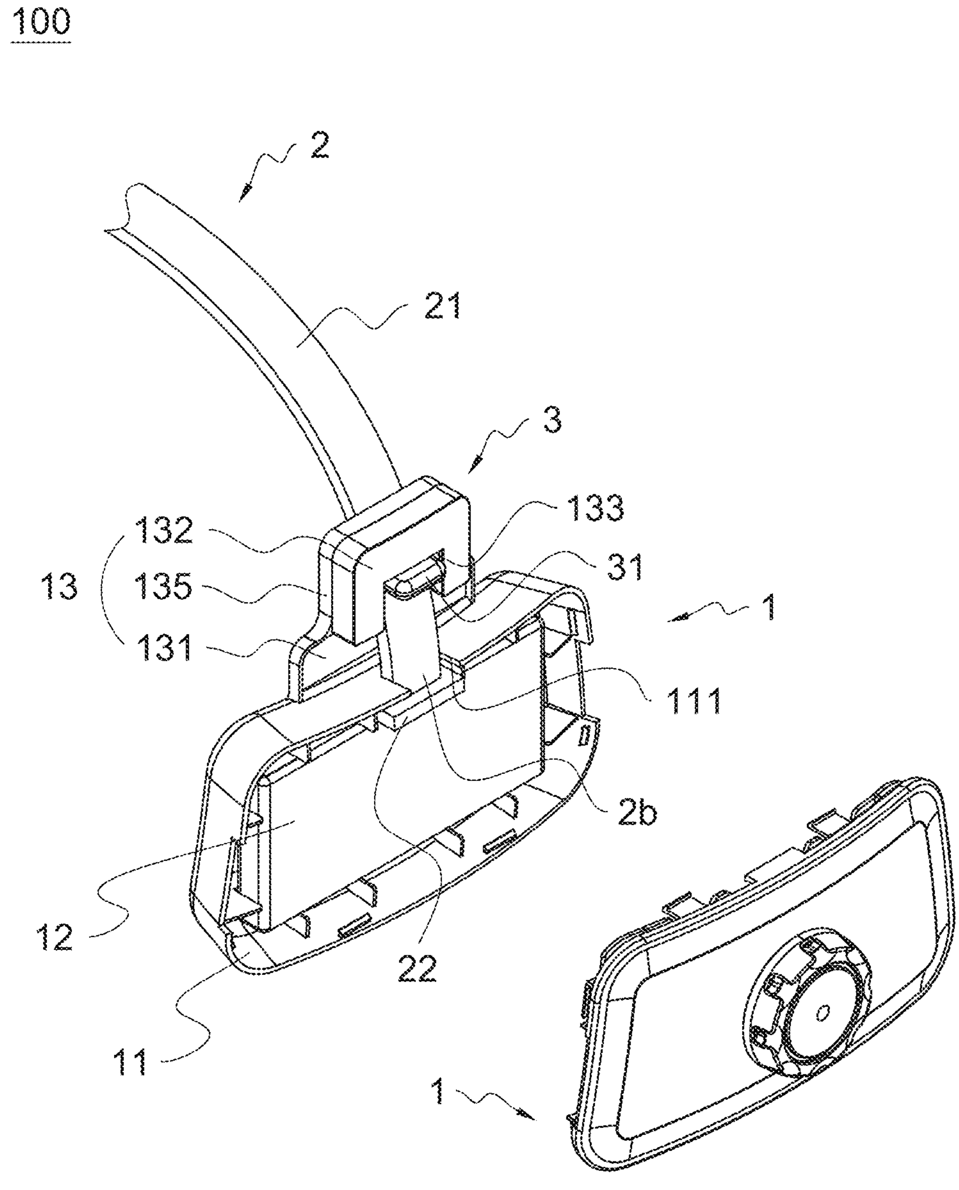
FIG. 4 is a partially exploded view of a wearable part of the head-mounted display device according to the present invention.
Figure 5:
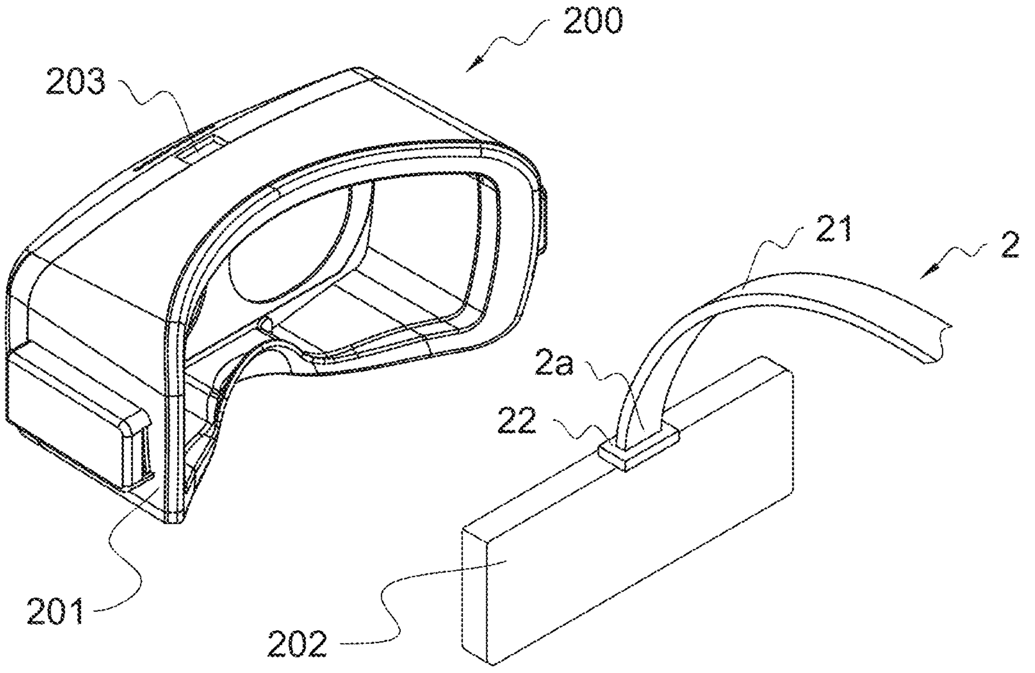
FIG. 5 is a partially exploded view of a display part of the head-mounted display device according to the present invention.
Figure 6:
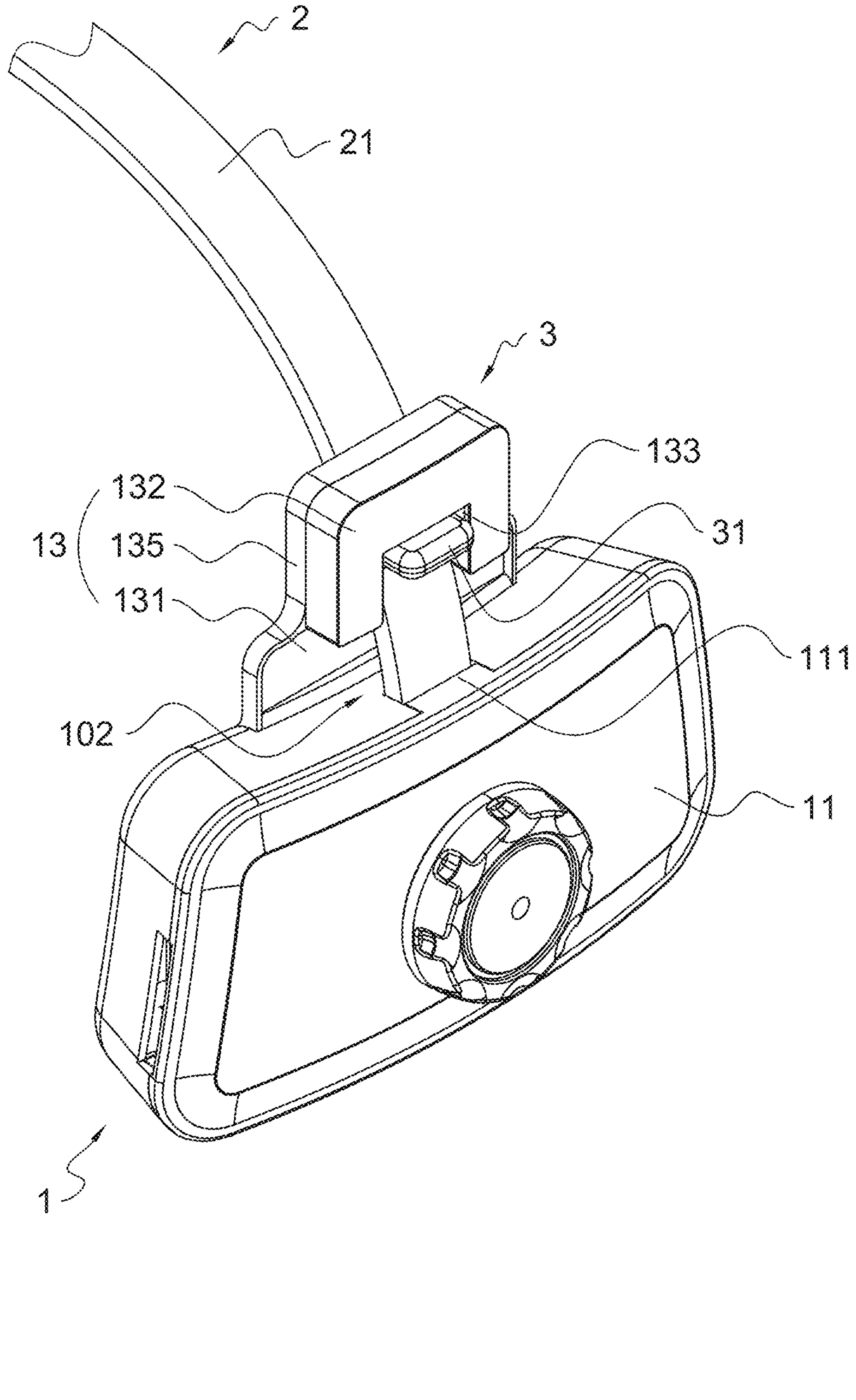
FIG. 6 is a partially perspective view of the wearable part of the head-mounted display device according to the present invention.

Referring to FIG. 2, FIG. 4 and FIG. 5, the upper head band 2 is electrically connected between the display part 200 and the wearable part 100. An inside of the upper head band 2 is equipped with a wire structure (not shown). An outer side of the upper head band 2 further includes an enclosing structure 21. The enclosing structure 21 surrounds the wire structure, and the enclosing structure 21 protects the wire structure. The enclosing structure 21 is made of a flexible material, such as a rubber material, a silicone material, etc. The upper head band 2 is bent according to the shape of the head of the user. The upper head band 2 is attached on the top of the head of the user. Because the rubber material and silicone material have larger friction forces, a friction resistance between the enclosing structure 21 and the top of the head of the user is increased, and the friction resistance between the enclosing structure 21 and the top of the head of the user prevents the upper head band 2 from slipping off.

The display part 200 has a notch 203 vertically penetrating through the top of the display part 200. The display housing 201 has the notch 203 vertically penetrating through a middle of a front of a top of the display housing 201. The main housing 11 has an opening 111 vertically penetrating through a middle of a top of the main housing 11. The notch 203 and the opening 111 are rectangular. The beginning end 2*a* of the upper head band 2 is threaded into the notch 203 of the display housing 201, so that the one end of the upper head band 2 is connected to the display part 200, the one end of the upper head band 2 is fastened to the display part 200, and the one end of the upper head band 2 is electrically connected to the display module 202. The terminal end 2*b* of the upper head band 2 is threaded into the opening 111 of the main housing 11, so that the other end of the upper head band 2 is connected to the main body 1, the other end of the upper head band 2 is fastened to the main body 1 and the other end of the upper head band 2 is electrically connected to the power supply module 12.

When an overly large pulling force is exerted on the upper head band 2 to pull the upper head band 2, in order to avoid the upper head band 2 breaking away from the display part 200 and the power supply module 12, two free ends of the enclosing structure 21 of the upper head band 2 protrude outward and expand outward to form two stopping portions 22. The two stopping portions 22 are rectangular. The two stopping portions 22 are larger than the notch 203 and the opening 111 in size, two opposite ends of the upper head band 2 are threaded into the opening 111 and the notch 203 to be fastened between the main housing 11 and the display part 200, so that one stopping portion 22 is received in the main housing 11 through the opening 111 and the one stopping portion 22 abuts against a bottom surface of a wall of the opening 111, and the other stopping portion 22 is received in the display housing 201 of the display part 200 through the notch 203 and the other stopping portion 22 abuts against a bottom surface of a wall of the notch 203.

Referring to FIG. 3 to FIG. 10, the flexible adjusting clip 3 includes the extension housing 13, the penetrating groove 133 longitudinally penetrating through a middle of an upper portion of the extension housing 13, the two guiding units 134 protruded rearward from two sides of the rear surface of the operating part 135, and two elastic elements 32. The two elastic elements 32 are received in the receiving space 137. The adjusting button 31 is movably mounted to the two guiding units 134. The two elastic elements 32 are mounted between the two guiding units 134 and the adjusting button 31 for ensuring that the adjusting button 31 elastically move upward and downward along the penetrating groove 133. The upper head band 2 is threaded into the penetrating groove 133, and the adjusting button 31 is movably clamped to the clamping portion 301. The terminal end 2*b* of the upper head band 2 passes through the penetrating groove 133 to be fastened to the main body 1. The two elastic elements 32 elastically push against the adjusting button 31 to make the adjusting button 31 tighten the upper head band 2, and simultaneously, the adjusting button 31 presses against the clamping portion 301, so that the upper head band 2 keeps being fastened in the flexible adjusting clip 3. Because the enclosing structure 21 of the upper head band 2 is made of the rubber material or the silicone material to enhance the friction resistance between the adjusting button 31 and the enclosing structure 21 to prevent a displacement of the upper head band 2 with the adjusted length.

The base portion 131 is extended upward from the upper surface of the main housing 11, the operating part 135 is extended upward from the middle of the top of the base portion 131, and the protective cover 132 is covered to the rear surface of the operating part 135 for accommodating the adjusting button 31. The upper surface of the main housing 11 of the main body 1 is spaced from the bottom surface of the protective cover 132 along an up-down direction to form the holding space 136 between the upper surface of the main housing 11 of the main body 1 and the bottom surface of the protective cover 132, and the holding space 136 is blocked by a lower portion of the rear surface of the base portion 131, so the user conveniently pulls the upper head band 2 from the adjusting space 102 to adjust the wearing space 101. The penetrating groove 133 longitudinally penetrates through a middle of the operating part 135 and longitudinally penetrates through the protective cover 132. The protective cover 132 is formed in an inverted-U shape. The penetrating groove 133 penetrates through the bottom surface of the protective cover 132. The adjusting button 31 has a pushing portion 313 protruded rearward from a rear surface of the adjusting button 31. The pushing portion 313 extends out of the receiving space 137, and the pushing portion 313 further projects out of the protective cover 132 through the penetrating groove 133, so the pushing portion 313 is provided for the user to adjust a position of the adjusting button 31.

Figure 7:
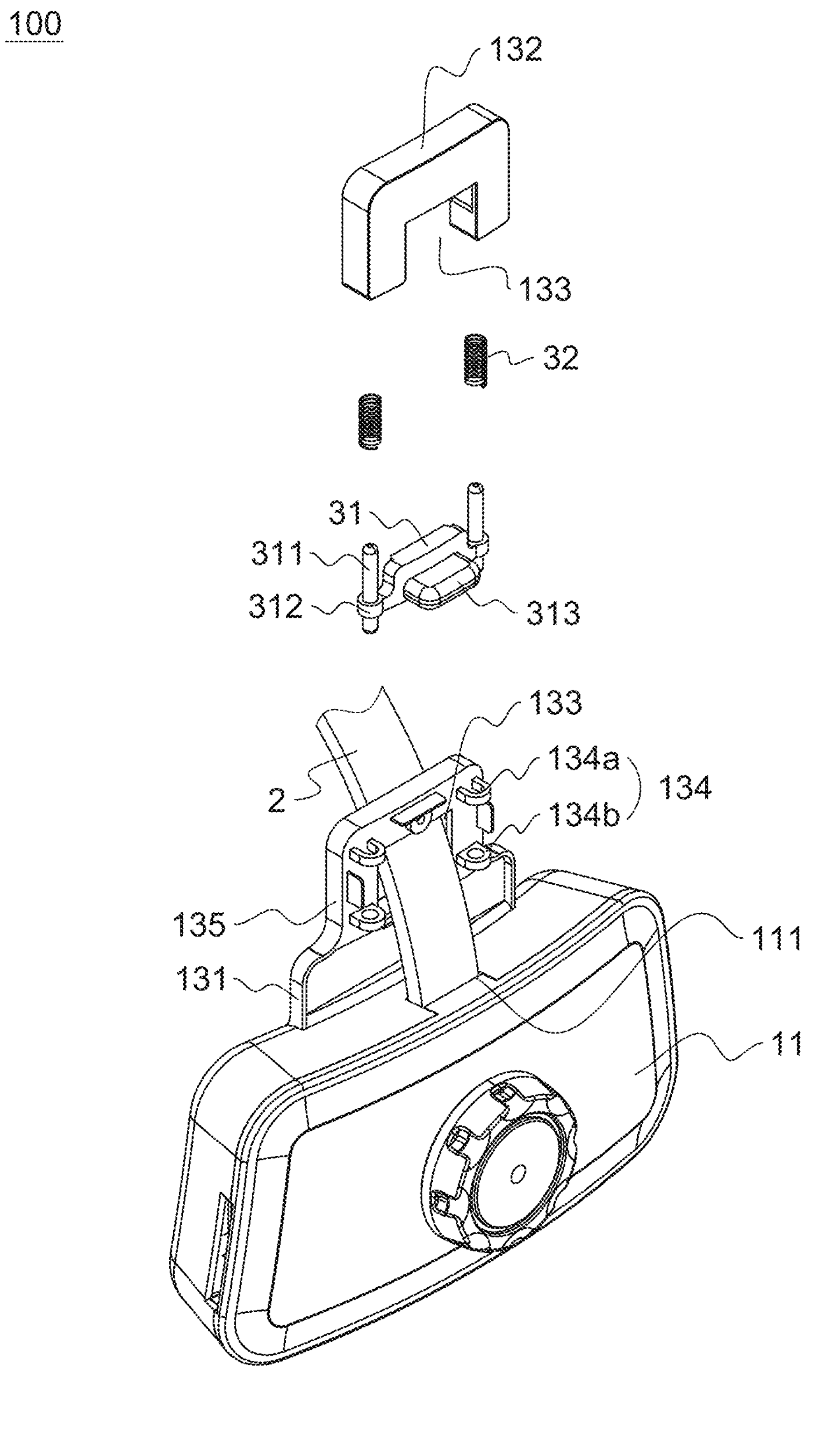
FIG. 7 is another partially exploded view of the wearable part of the head-mounted display device according to the present invention.
Figure 8:
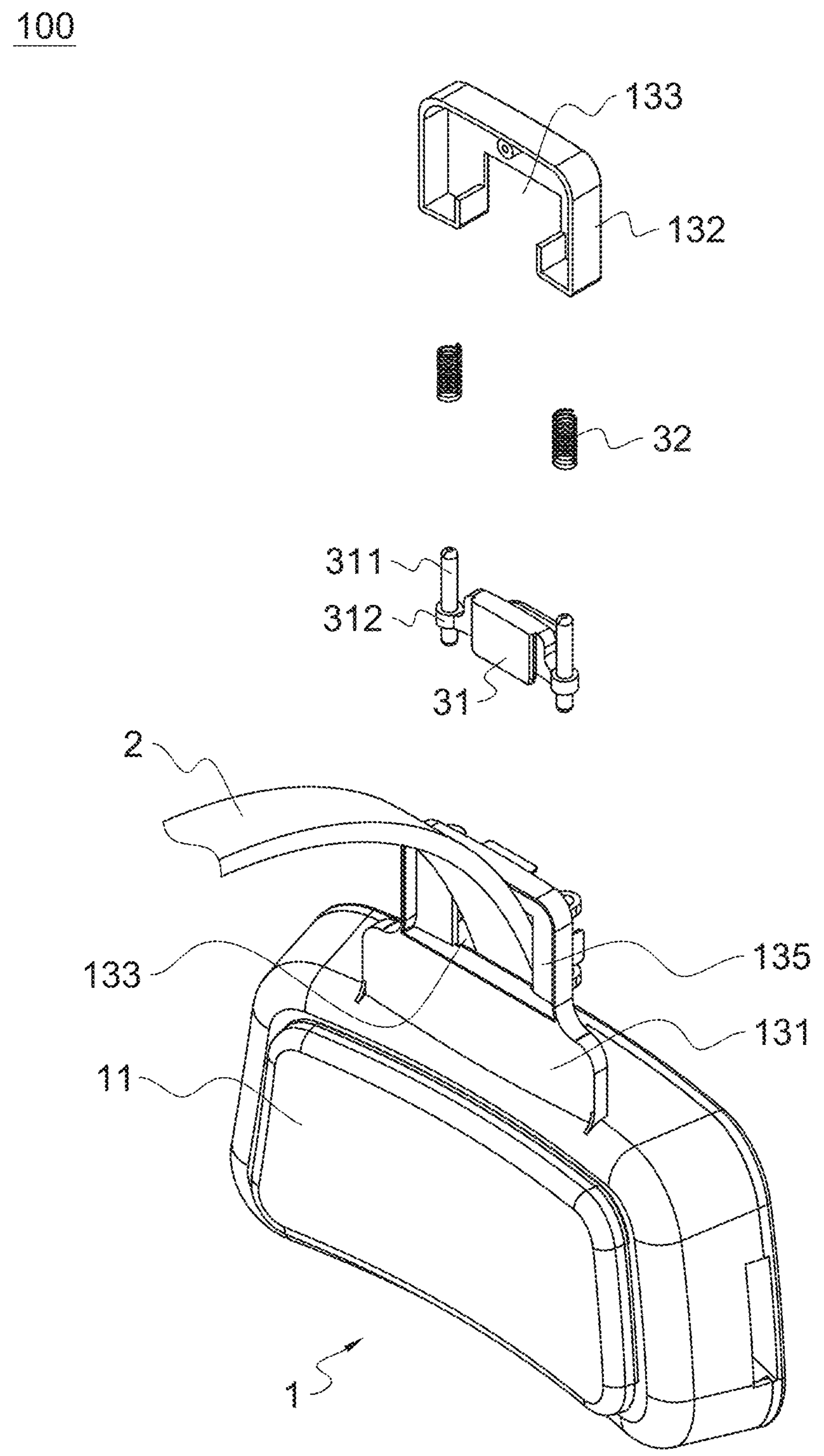
FIG. 8 is one more partially exploded view of the wearable part of the head-mounted display device according to the present invention.
Figure 9:
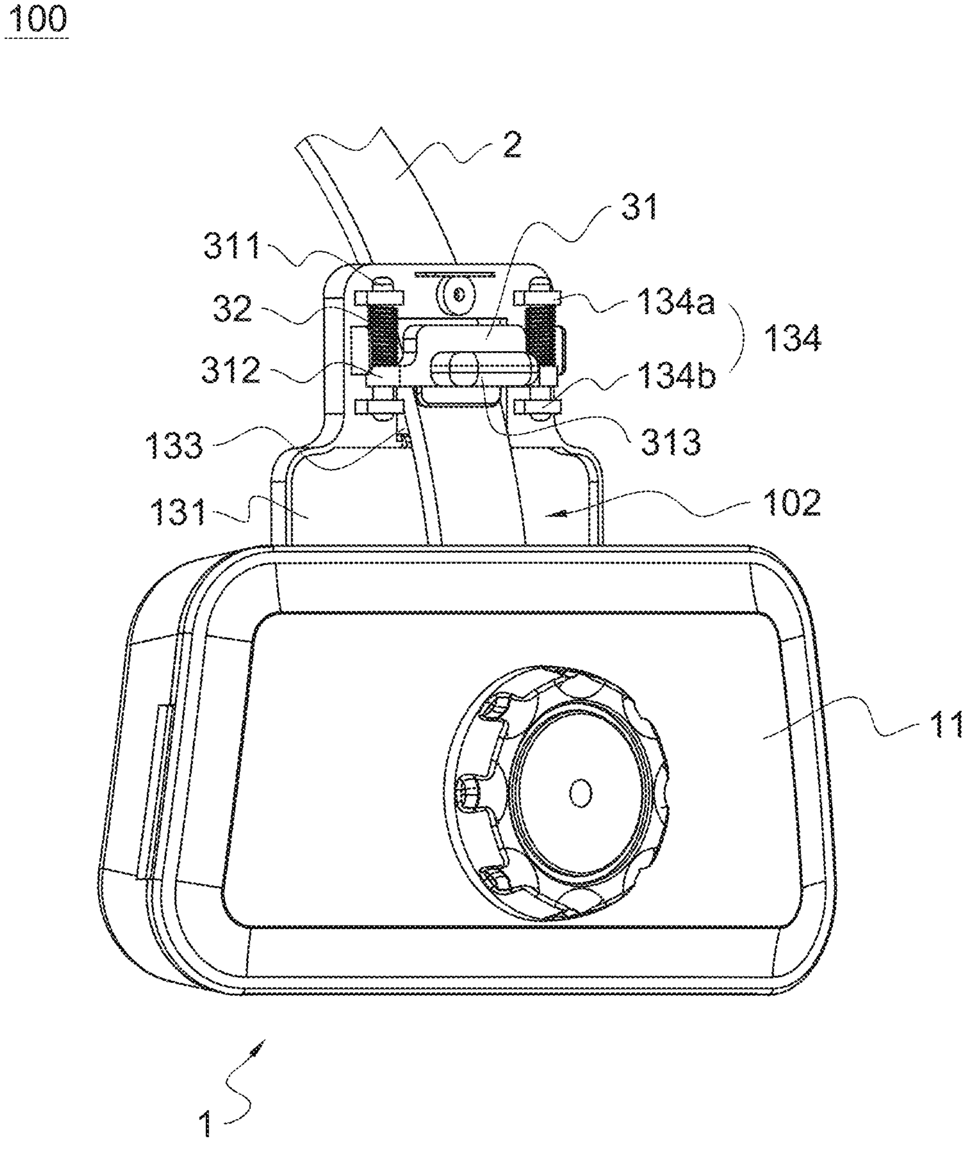
FIG. 9 is a schematic diagram showing that an adjusting button of the wearable part of the head-mounted display device moves upward along a direction of a pushing force which is exerted to the adjusting button according to the present invention.
Figure 10:
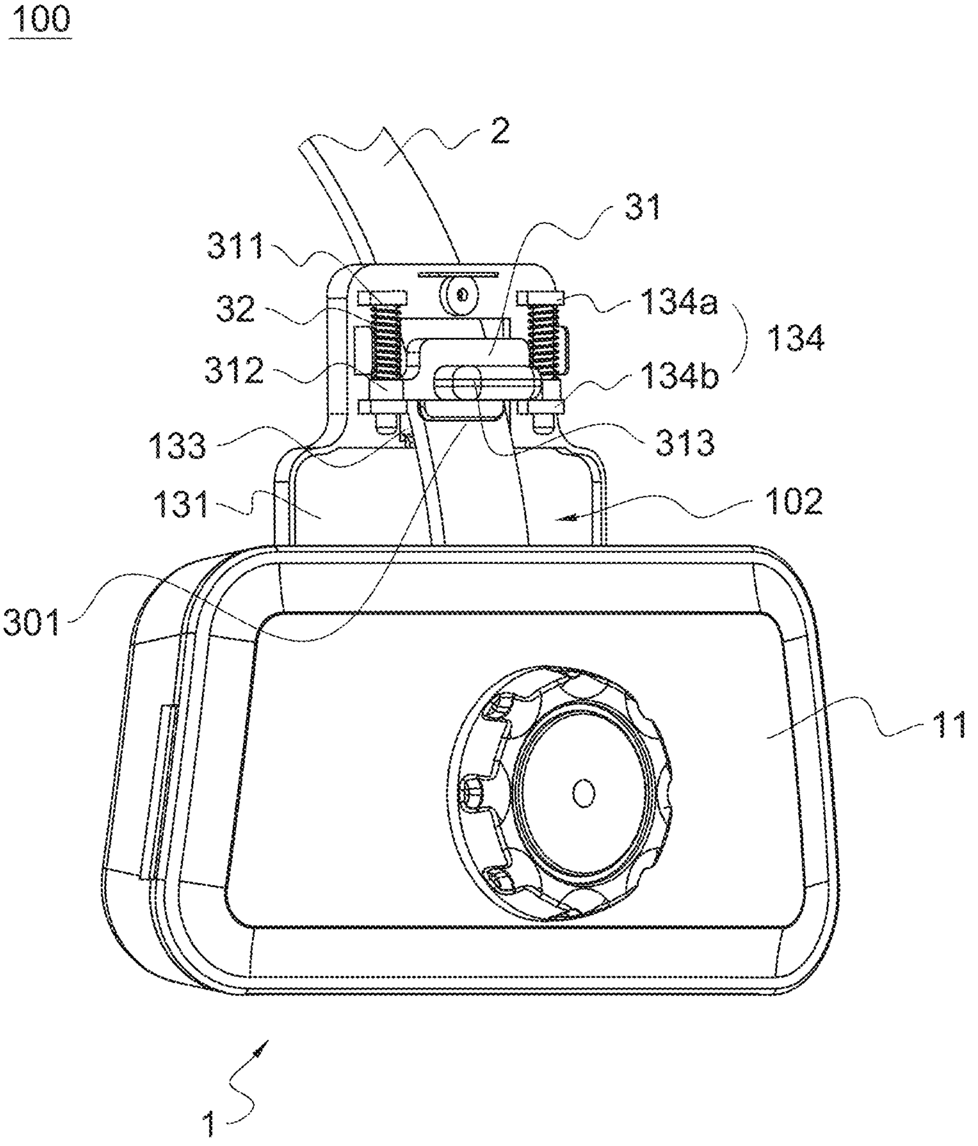
FIG. 10 is a schematic diagram showing that the adjusting button is returned to an original position along a direction of a reverse force which is opposite to the pushing force, wherein a flexible adjusting clip is fastened to a clamping portion of an upper head band in accordance with the present invention.

Referring to FIG. 7, the two guiding units 134 are located to two sides of the penetrating groove 133. Each guiding unit 134 includes a first guiding ring 134*a* and a second guiding ring 134*b* which are in alignment with each other. The two first guiding rings 134*a* of the two guiding units 134 are aligned. The two second guiding rings 134*b* of the two guiding units 134 are aligned. The two first guiding rings 134*a* and the two second guiding rings 134*b* are arranged in two rows. The two first guiding rings 134*a* of the two guiding units 134 are protruded rearward and towards the protective cover 132 from two upper portions of two sides of the rear surface of the operating part 135. The two second guiding rings 134*b* of the two guiding units 134 are protruded rearward and towards the protective cover 132 from two lower portions of the two sides of the rear surface of the operating part 135. The two first guiding rings 134*a* of the two guiding units 134 are located above the two second guiding rings 134*b* of the two guiding units 134. The two first guiding rings 134*a* of the two guiding units 134 are transversely aligned. The two second guiding rings 134*b* of the two guiding units 134 are transversely aligned. The first guiding ring 134*a* and the second guiding ring 134*b* of each guiding unit 134 are aligned along the up-down direction.

The adjusting button 31 has two guiding rods 311 and a fastening portion 314. A portion of an outer peripheral surface of each guiding rod 311 extends radially to form a limiting ring 312. The fastening portion 314 is connected between two inner portions of the two limiting rings 312 of the two guiding rods 311. A middle of an outer surface of the fastening portion 314 protrudes outward and perpendicular to the two guiding rods 311 to form the pushing portion 313. The pushing portion 313 is located between the two limiting rings 312 of the two guiding rods 311. The pushing portion 313 projects out of the receiving space 137. The pushing portion 313 is movably exposed out of the penetrating groove 133. The upper head band 2 passes through the penetrating groove 133. The adjusting button 31 movably blocks the upper head band 2. The upper head band 2 is movably disposed between the fastening portion 314 and a wall of the penetrating groove 133. The two guiding rods 311 move along the two guiding units 134 to compress the two elastic elements 32 to make the fastening portion 314 of the adjusting button 31 move away from the wall of the penetrating groove 133 or release the two elastic elements 32 to make the fastening portion 314 of the adjusting button 31 approach the wall of the penetrating groove 133, so the upper head band 2 is pulled through the adjusting space 102 to adjust the length of the upper head band 2, or the clamping portion 301 of the upper head band 2 is clamped between the fastening portion 314 and the wall of the penetrating groove 133 to make the upper head band 2 fastened by the flexible adjusting clip 3. The adjusting button 31 is movably disposed in the penetrating groove 133, and the pushing portion 313 is pushed upward or released to make the adjusting button 31 move upward or move downward with respect to the extension housing 13.

Two opposite sides of the adjusting button 31 have the two guiding rods 311 extending vertically. A lower portion of the outer peripheral surface of each guiding rod 311 extends radially to form the limiting ring 312. The two inner portions of the two limiting rings 312 of the two guiding rods 311 protrude towards each other and then extend vertically to form the fastening portion 314. A middle of a rear surface of the fastening portion 314 protrudes rearward to form the pushing portion 313. The two guiding rods 311 are cooperated with the two guiding units 134. The two elastic elements 32 are worn around the two guiding rods 311. The two elastic elements 32 are located to two top surfaces of the two limiting rings 312 of the two guiding rods 311. One end of each guiding rod 311 passes through the first guiding ring 134*a* of one guiding unit 134, and the other end of each guiding rod 311 passes through the second guiding ring 134*b* of the one guiding unit 134. The two guiding rods 311 are combined with the two guiding units 134.

Two top ends of the two guiding rods 311 pass through the two first guiding rings 134*a* of the two guiding units 134, and two bottom ends of the two guiding rods 311 pass through the two second guiding rings 134*b* of the two guiding units 134. The two elastic elements 32 are elastically located between two bottom surfaces of the two first guiding rings 134*a* of the extension housing 13 and the two top surfaces of the two limiting rings 312 of the adjusting button 31. The two guiding rods 311 move upward and downward along the two guiding units 134. The two limiting rings 312 and the two elastic elements 32 are positioned between the two first guiding rings 134*a* and the two second guiding rings 134*b*. The two limiting rings 312 move upward and downward along the two guiding units 134. Each elastic element 32 is a compression spring. Two top ends of the two elastic elements 32 elastically abut against the two bottom surfaces of the two first guiding rings 134*a* of the two guiding units 134 of the extension housing 13. Two bottom ends of the two elastic elements 32 elastically abut against the two top surfaces of the two limiting rings 312 of the adjusting button 31.

Referring to FIG. 2, FIG. 3, FIG. 9 and FIG. 10, a gap 103 is formed between the adjusting button 31 and the penetrating groove 133. A position of the clamping portion 301 of the upper head band 2 is defined to be positioned in the gap 103 which is formed between the adjusting button 31 and the penetrating groove 133. The adjusting button 31 moves upward and downward with respect to the penetrating groove 133 to adjust the gap 103. Specifically, a lower portion of the adjusting button 31 is spaced from a lower wall of the penetrating groove 133, so a lower portion of the gap 103 is formed between the lower portion of the fastening portion 314 of the lower portion of the adjusting button 31 and the lower wall of the penetrating groove 133. The adjusting button 31 moves upward and downward with respect to the penetrating groove 133 to increase the lower portion of the gap 103 or decrease the lower portion of the gap 103. The upper head band 2 passes through the gap 103. The other end of the upper head band 2 which is connected to the main body 1 passes through the gap 103, the lower portion of the adjusting button 31 is correspondingly disposed at the clamping portion 301 of the upper head band 2, and the clamping portion 301 of the upper head band 2 is clamped between the lower portion of the adjusting button 31 and the lower wall of the penetrating groove 133, specifically, the clamping portion 301 of the upper head band 2 is clamped between a lower portion of the fastening portion 314 and the lower wall of the penetrating groove 133.

Referring to FIG. 1 to FIG. 10, in practice, the user is able to push upward against the pushing portion 313 by one hand. When the user pushes upward the pushing portion 313 of the adjusting button 31 by the one hand, a pushing force is exerted to the adjusting button 31, the two guiding rods 311 move upward, the adjusting button 31 moves upward, the two elastic elements 32 are compressed between the two bottom surfaces of the two first guiding rings 134*a* of the two guiding units 134 and the two top surfaces of the two limiting rings 312 in a direction of the pushing force, the lower portion of the gap 103 between the lower portion of the fastening portion 314 of the lower portion of the adjusting button 31 and the lower wall of the penetrating groove 133 is increased. Then the user uses the other hand to pull the upper head band 2 outward from the adjusting space 102, at the moment, the upper head band 2 freely passes through the gap 103 to adjust the wearing space 101 according to the size of the head of the user. Therefore, the user is able to adjust the length of the upper head band 2 under a status of wearing the head-mounted display device 400, and an excessive portion of the upper head band 2 which is pulled outward by the user is bent in the adjusting space 102.

When the user releases the pushing portion 313, the two guiding rods 311 move downward, the two elastic elements 32 rebound to original states in a direction of a reverse force which is opposite to the pushing force, the two limiting rings 312 press downward against two top surfaces of the two second guiding rings 134*b*, the adjusting button 31 moves downward, and the adjusting button 31 is returned to an original position. At the moment, the lower portion of the gap 103 between the lower portion of the fastening portion 314 and the lower wall of the penetrating groove 133 is decreased, and the lower portion of the adjusting button 31 presses against the clamping portion 301 of the upper head band 2 to fasten the upper head band 2 in place. Specifically, the clamping portion 301 of the upper head band 2 is clamped between the lower portion of the fastening portion 314 and the lower wall of the penetrating groove 133 to fasten the clamping portion 301 of the upper head band 2 to the flexible adjusting clip 3.

In a concrete implementation, the adjusting button 31 may also be able to be arranged to move frontward and rearward with respect to the penetrating groove 133 to change a size of the gap 103, and positioning directions of the two elastic elements 32, the two guiding rods 311 of the adjusting button 31 and the two guiding units 134 shall be together altered to frontward and rearward directions. Alternatively, the adjusting button 31 may also be able to be arranged to move leftward and rightward with respect to the penetrating groove 133 to change the size of the gap 103, and positioning directions of the two elastic elements 32, the two guiding rods 311 of the adjusting button 31 and the two guiding units 134 shall be together altered to leftward and rightward directions. In the present invention, the flexible adjusting clip 3 is disposed on top of the main body 1, and the flexible adjusting clip 3 includes the extension housing 13, and the adjusting button 31 disposed between the protective cover 132 and the operating part 135, the two elastic elements 32 cooperated with the adjusting button 31 to be combined with the adjusting button 31, and the two guiding units 134.

As described above, the head-mounted display device 400 includes the wearable part 100 surrounding the head of the user to provide the support for the display part 200, and the display part 200 worn in front of the two eyes of the user to display the image to the user, the wearable part 100 includes the main body 1, the upper head band 2 of which the two ends are connected between the top of the main body 1 and the top of the display part 200, the extension housing 13 extended upward from the upper surface of the main housing 11 of the main body 1, and the flexible adjusting clip 3 mounted on the main body 1, so that the user selects any position between the beginning end 2*a* and the terminal end 2*b* of the upper head band 2 as the clamping portion 301 of the upper head band 2 according to the need of the user, and then the flexible adjusting clip 3 is fixed to the clamping portion 301 of the upper head band 2 to adjust the length of the upper head band 2 between the wearable part 100 and the display part 200. Furthermore, in order to facilitate pulling the upper head band 2 by the user, the longitudinal distance is formed between the base portion 131 of the extension housing 13 and the terminal end 2*b* of the upper head band 2, so the adjusting space 102 is formed among the clamping portion 301, the base portion 131 of the extension housing 13, and the terminal end 2*b* of the upper head band 2, the adjusting space 102 brings the convenience for the user to pull the upper head band 2, and the adjusting button 31 is pushed to pull the upper head band 2 from the adjusting space 102 to effectively adjust an overall length of the upper head band 2 between the main body 1 and the display part 200 for changing the size of the wearing space 101. In addition, the adjusting button 31 is fastened to clamping portion 301 of the upper head band 2, so that the upper head band 2 which has the adjusted length keeps being fastened to a position of the head-mounted display device 400, the head-mounted display device 400 prevents the upper head band 2 from getting loose, and the wearable part 100 of the head-mounted display device 400 is able to adjust the length of the upper head band 2 conveniently and is worn more stably. As a result, a wearing stability of the head-mounted display device 400 is improved.

What is claimed is:

1. A wearable part, comprising:

a main body;

an upper head band having a terminal end, the terminal end connected to a top of the main body;

a flexible adjusting clip mounted on the top of the main body, the flexible adjusting clip having:

an extension housing having:

a base portion extended upward from an upper surface of the main body;

an operating part extended upward from a middle of a top of the base portion; and two abreast guiding units protruded outward from an outer portion of the operating part;

an adjusting space being formed between the base portion and the main body, each guiding unit having a first guiding ring and a second guiding ring which are in alignment with each other, the two first guiding rings of the two guiding units being aligned, the two second guiding rings of the two guiding units being aligned, the two first guiding rings and the two second guiding rings being arranged in two rows;

a penetrating groove longitudinally penetrating through the extension housing, the terminal end of the upper head band passing through the penetrating groove;

an adjusting button movably received in the extension housing, the adjusting button having two guiding rods and a fastening portion, the upper head band being movably disposed between the fastening portion and a wall of the penetrating groove, a portion of an outer peripheral surface of each guiding rod extending radially to form a limiting ring, the fastening portion being connected between two inner portions of the two limiting rings of the two guiding rods, a middle of an outer surface of the fastening portion protruding outward and perpendicular to the two guiding rods to form a pushing portion, the pushing portion being located between the two limiting rings of the two guiding rods, the pushing portion being movably exposed out of the penetrating groove; and two elastic elements worn around the two guiding rods, one end of each guiding rod passing through the first guiding ring of one guiding unit, and the other end of each guiding rod passing through the second guiding ring of the one guiding unit, the two elastic elements being elastically located between the two first guiding rings and the two limiting rings, the two limiting rings and the two elastic elements being positioned between the two first guiding rings and the two second guiding rings, the two guiding rods moving along the two guiding units to compress the two elastic elements to make the fastening portion of the adjusting button move away from the wall of the penetrating groove or release the two elastic elements to make the fastening portion of the adjusting button approach the wall of the penetrating groove, so the upper head band being pulled through the adjusting space to adjust a length of the upper head band, or the upper head band being clamped between the fastening portion and the wall of the penetrating groove to make the upper head band fastened by the flexible adjusting clip.

2. The wearable part as claimed in claim 1, wherein the main body has a main housing and a power supply module received in the main housing, the extension housing is extended upward from an upper surface of the main housing, the base portion is extended upward from the upper surface of the main housing, a rear end of the extension housing has a protective cover, the protective cover is covered to a rear surface of the operating part for accommodating the adjusting button, a receiving space is formed between the operating part and the protective cover, the adjusting button is received in the receiving space.

3. The wearable part as claimed in claim 2, wherein the upper surface of the main housing of the main body is spaced from a bottom surface of the protective cover along an up-down direction to form a holding space between the upper surface of the main housing of the main body and the bottom surface of the protective cover, and the holding space is blocked by a lower portion of a rear surface of the base portion.

4. The wearable part as claimed in claim 2, wherein the penetrating groove longitudinally penetrates through a middle of the operating part and longitudinally penetrates through the protective cover, the two guiding units are located to two sides of the penetrating groove, the two first guiding rings are protruded rearward and towards the protective cover from two upper portions of two sides of the rear surface of the operating part, the two second guiding rings are protruded rearward and towards the protective cover from two lower portions of the two sides of the rear surface of the operating part, the two first guiding rings are located above the two second guiding rings, the two first guiding rings are transversely aligned, the two second guiding rings are transversely aligned, the first guiding ring and the second guiding ring of each guiding unit are aligned along an up-down direction.

5. The wearable part as claimed in claim 2, wherein the adjusting button is movably disposed in the penetrating groove, and the pushing portion is pushed upward or released to make the adjusting button move upward or move downward with respect to the extension housing, two opposite sides of the adjusting button have the two guiding rods extending vertically, a lower portion of the outer peripheral surface of each guiding rod extends radially to form the limiting ring, the two inner portions of the two limiting rings protrude towards each other and then extend vertically to form the fastening portion, the two guiding rods are cooperated with the two guiding units, the two guiding rods are combined with the two guiding units, the two elastic elements are elastically located between two bottom surfaces of the two first guiding rings and two top surfaces of the two limiting rings, the two guiding rods move upward and downward along the two guiding units, the two limiting rings move upward and downward along the two guiding units, two top ends of the two elastic elements elastically abut against the two bottom surfaces of the two first guiding rings, two bottom ends of the two elastic elements elastically abut against the two top surfaces of the two limiting rings.

6. The wearable part as claimed in claim 2, wherein a middle of a rear surface of the fastening portion protrudes rearward to form the pushing portion, the pushing portion extends out of the receiving space, and the pushing portion further projects out of the protective cover through the penetrating groove.

7. The wearable part as claimed in claim 2, wherein the main housing has an opening vertically penetrating through a middle of a top of the main housing, an outer side of the upper head band includes an enclosing structure, free end of the enclosing structure protrude outward and expand outward to form a stopping portion, the stopping portion is rectangular, the opening are rectangular, the stopping portion is larger than the opening in size, the terminal end of the upper head band is threaded into the opening, so that the stopping portion is received in the main housing through the opening and the stopping portion abuts against a bottom surface of a wall of the opening.

8. The wearable part as claimed in claim 1, wherein a gap is formed between the adjusting button and the penetrating groove, the upper head band passes through the gap, when a user pushes upward the pushing portion, the two guiding rods move upward, the adjusting button moves upward, the two elastic elements are compressed between the two first guiding rings and the two limiting rings, a lower portion of the gap between a lower portion of the fastening portion and a lower wall of the penetrating groove is increased, when the user releases the pushing portion, the two guiding rods move downward, the two elastic elements rebound to original states, the adjusting button moves downward, and the adjusting button is returned to an original position, the lower portion of the gap between the lower portion of the fastening portion and the lower wall of the penetrating groove is decreased, the terminal end is connected to the top of the main body, so that any position of the upper head band is selectable to be defined as a clamping portion by the user, the clamping portion of the upper head band is clamped between the lower portion of the fastening portion and the lower wall of the penetrating groove to fasten the clamping portion of the upper head band to the flexible adjusting clip.

9. The wearable part as claimed in claim 1, wherein each elastic element is a compression spring.

10. A head-mounted display device, comprising:

a wearable part having:

a main body;

an upper head band, one end of the upper head band having a beginning end, and the other end of the upper head band having a terminal end, the terminal end being fastened with a top of the main body of the wearable part, any position of the upper head band between the beginning end and the terminal end being selectable to be defined as a clamping portion;

two side head bands, two ends of the two side head bands being connected with two sides of the main body; and a flexible adjusting clip mounted on the main body, the flexible adjusting clip having:

an extension housing having a base portion extended upward from an upper surface of the main body, an operating part extended upward from a middle of a top of the base portion, and two abreast guiding units protruded outward from an outer portion of the operating part, an adjusting space being formed between the base portion and the main body, each guiding unit having a first guiding ring and a second guiding ring which are in alignment with each other, the two first guiding rings of the two guiding units being aligned, the two second guiding rings of the two guiding units being aligned, the two first guiding rings and the two second guiding rings being arranged in two rows;

a penetrating groove longitudinally penetrating through the extension housing, the upper head band passing through the penetrating groove;

an adjusting button movably received in the extension housing, the adjusting button having two guiding rods and a fastening portion, the upper head band being movably disposed between the fastening portion and a wall of the penetrating groove, a portion of an outer peripheral surface of each guiding rod extending radially to form a limiting ring, the fastening portion being connected between two inner portions of the two limiting rings of the two guiding rods, a middle of an outer surface of the fastening portion protruding outward and perpendicular to the two guiding rods to form a pushing portion, the pushing portion being located between the two limiting rings of the two guiding rods, the pushing portion being movably exposed out of the penetrating groove; and two elastic elements worn around the two guiding rods, one end of each guiding rod passing through the first guiding ring of one guiding unit, and the other end of each guiding rod passing through the second guiding ring of the one guiding unit, the two elastic elements being elastically located between the two first guiding rings and the two limiting rings, the two limiting rings and the two elastic elements being positioned between the two first guiding rings and the two second guiding rings, the two guiding rods moving along the two guiding units to compress the two elastic elements to make the fastening portion of the adjusting button move away from the wall of the penetrating groove or release the two elastic elements to make the fastening portion of the adjusting button approach the wall of the penetrating groove, so the upper head band being pulled through the adjusting space to adjust a length of the upper head band, or the clamping portion of the upper head band being clamped between the fastening portion and the wall of the penetrating groove to make the upper head band fastened by the flexible adjusting clip; and a display part, the beginning end of the upper head band being fastened with a top of the display part, the other two ends of the two side head bands being connected with two sides of the display part.

11. The head-mounted display device as claimed in claim 10, wherein the main body has a main housing, and a power supply module received in the main housing, the extension housing is extended upward from an upper surface of the main housing, the base portion is extended upward from the upper surface of the main housing, a rear end of the extension housing further has a protective cover, the protective cover is covered to a rear surface of the operating part for accommodating the adjusting button, a receiving space is formed between the operating part and the protective cover, the adjusting button is received in the receiving space.

12. The head-mounted display device as claimed in claim 11, wherein the upper surface of the main housing of the main body is spaced from a bottom surface of the protective cover along an up-down direction to form a holding space between the upper surface of the main housing of the main body and the bottom surface of the protective cover, and the holding space is blocked by a lower portion of a rear surface of the base portion.

13. The head-mounted display device as claimed in claim 11, wherein the penetrating groove longitudinally penetrates through a middle of the operating part and longitudinally penetrates through the protective cover, the two guiding units are located to two sides of the penetrating groove, the two first guiding rings are protruded rearward and towards the protective cover from two upper portions of two sides of the rear surface of the operating part, the two second guiding rings are protruded rearward and towards the protective cover from two lower portions of the two sides of the rear surface of the operating part, the two first guiding rings are located above the two second guiding rings, the two first guiding rings are transversely aligned, the two second guiding rings are transversely aligned, the first guiding ring and the second guiding ring of each guiding unit are aligned along an up-down direction.

14. The head-mounted display device as claimed in claim 11, wherein the adjusting button is movably disposed in the penetrating groove, and the pushing portion is pushed upward or released to make the adjusting button move upward or move downward with respect to the extension housing, two opposite sides of the adjusting button have the two guiding rods extending vertically, a lower portion of the outer peripheral surface of each guiding rod extends radially to form the limiting ring, the two inner portions of the two limiting rings protrude towards each other and then extend vertically to form the fastening portion, the two guiding rods are cooperated with the two guiding units, the two guiding rods are combined with the two guiding units, the two elastic elements are elastically located between two bottom surfaces of the two first guiding rings and two top surfaces of the two limiting rings, the two guiding rods move upward and downward along the two guiding units, the two limiting rings move upward and downward along the two guiding units, two top ends of the two elastic elements elastically abut against the two bottom surfaces of the two first guiding rings, two bottom ends of the two elastic elements elastically abut against the two top surfaces of the two limiting rings.

15. The head-mounted display device as claimed in claim 11, wherein a middle of a rear surface of the fastening portion protrudes rearward to form the pushing portion, the pushing portion extends out of the receiving space, and the pushing portion further projects out of the protective cover through the penetrating groove.

16. The head-mounted display device as claimed in claim 11, wherein the display part includes a display housing, and a display module accommodated in the display housing, the display housing has a notch vertically penetrating through a middle of a front of a top of the display housing, the main housing has an opening vertically penetrating through a middle of a top of the main housing, the beginning end of the upper head band is threaded into the notch, the one end of the upper head band is electrically connected to the display module, the terminal end of the upper head band is threaded into the opening, the other end of the upper head band is electrically connected to the power supply module, an outer side of the upper head band includes an enclosing structure, two free ends of the enclosing structure protrude outward and expand outward to form two stopping portions, the two stopping portions are rectangular, the notch and the opening are rectangular, the two stopping portions are larger than the notch and the opening in size, so that one stopping portion is received in the main housing through the opening and the one stopping portion abuts against a bottom surface of a wall of the opening, and the other stopping portion is received in the display housing through the notch and the other stopping portion abuts against a bottom surface of a wall of the notch.

17. The head-mounted display device as claimed in claim 10, wherein a gap is formed between the adjusting button and the penetrating groove, the upper head band passes through the gap, when a user pushes upward the pushing portion, the two guiding rods move upward, the adjusting button moves upward, the two elastic elements are compressed between the two first guiding rings and the two limiting rings, a lower portion of the gap between a lower portion of the fastening portion and a lower wall of the penetrating groove is increased, when the user releases the pushing portion, the two guiding rods move downward, the two elastic elements rebound to original states, the adjusting button moves downward, and the adjusting button is returned to an original position, the lower portion of the gap between the lower portion of the fastening portion and the lower wall of the penetrating groove is decreased, the clamping portion of the upper head band is clamped between the lower portion of the fastening portion and the lower wall of the penetrating groove to fasten the clamping portion of the upper head band to the flexible adjusting clip.

18. A wearable part, comprising:

a main body;

an upper head band, the upper head band having a terminal end, the terminal end being fastened with the main body;

an adjusting clip mounted on the main body, the adjusting clip having:

an extension housing having:

a base portion extended from the main body;

an operating part extended from the base portion; and an adjusting space being formed between the base portion, the main body and the terminal end;

a penetrating groove longitudinally penetrating through the extension housing, the terminal end of the upper head band passing through the penetrating groove;

a protective cover covered to the operating part of the extension housing;

a receiving space formed between the protective cover and the operating part of the extension housing, the receiving space being communicated with the penetrating groove;

an adjusting button received in the receiving space, the adjusting button movably blocking the upper head band, the adjusting button having a fastening portion and a pushing portion, the upper head band being movably disposed between the fastening portion and a wall of the penetrating groove, the pushing portion projecting out of the receiving space, the pushing portion being movably exposed out of the penetrating groove; and at least one elastic element received in the receiving space to press the fastening portion to abut against the upper head band, the upper head band being clamped between the fastening portion and the wall of the penetrating groove.

* * * * *